Figure 1:
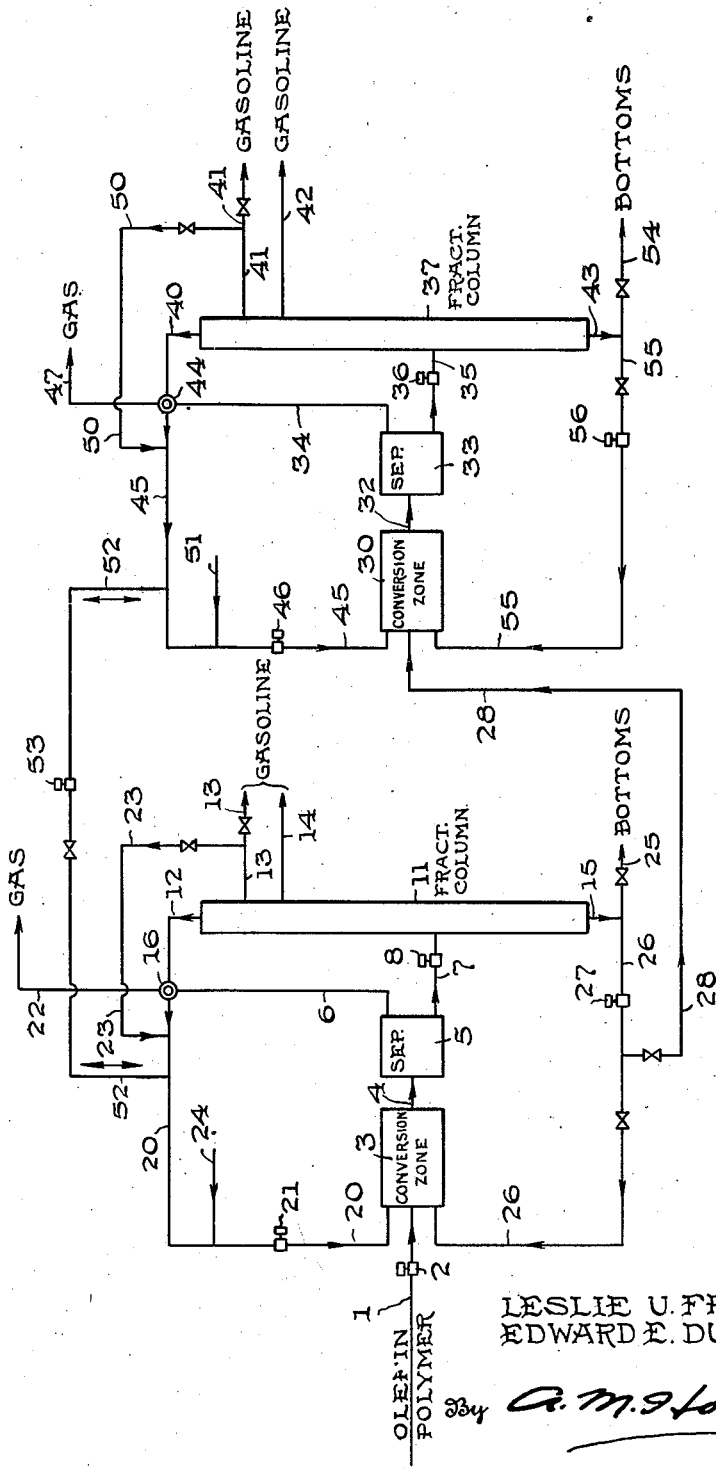

Aug. 28, 1945.     L. U. FRANKLIN ET AL     2,383,642
DEPOLYMERIZATION OF OLEFIN POLYMERS
Filed Oct. 13, 1941     3 Sheets-Sheet 1

Inventors
LESLIE U. FRANKLIN
EDWARD E. DUNLAY
By A. M. Loughton
Their Attorney

Inventors
LESLIE U. FRANKLIN
EDWARD E. DUNLAY

Inventors
LESLIE U. FRANKLIN
EDWARD E. DUNLAY

Patented Aug. 28, 1945

2,383,642

UNITED STATES PATENT OFFICE 2,383,642

DEPOLYMERIZATION OF OLEFIN POLYMERS

Leslie U. Franklin and Edward E. Dunlay, Port Arthur, Tex., assignors to Gulf Oil Corporation, Pittsburgh, Pa., a corporation of Pennsylvania Application October 13, 1941, Serial No. 414,898

5 Claims. (Cl. 196—50)

This invention relates to the depolymerization of olefin polymers; and it comprises a method of depolymerizing olefin polymers to produce gasoline wherein an olefin polymer of selected gravity is contacted with an adsorbent earth type of catalyst at a temperature sufficient to cause substantial depolymerization of the polymer to gasoline but insufficient to cause substantial cracking of the polymer, separating gasoline, and then contacting the residual polymer with the same or a similar catalyst at a higher temperature; all as more fully hereinafter set forth and as claimed.

It is known that the olefins, particularly the lower olefins such as ethylene, propylene, the butylenes and the amylenes, may be converted to useful products by polymerization, thermally or by contact with a catalyst such as phosphoric acid, sulfuric acid, aluminum chloride, or fuller's earth. The polymer products, depending upon the conditions of polymerization, such as the catalyst and temperature and time of contact employed, vary from light oils boiling in the gasoline boiling point range to very viscous, almost solid hydrocarbons. Insofar as the polymerization produces low boiling motor fuels of the type represented by diisobutylene (the dimer of isobutylene), the process of olefin polymerization is useful in producing gasoline and the like from the lower olefins. However, polymerization to such a degree is difficult, requiring close control of conditions and even so a considerable amount of polymer is produced which boils above the gasoline boiling point range. Thus, in the polymerization of isobutylene in the presence of sulfuric acid, some tri-isobutylene is usually formed along with the desired di-isobutylene. When aluminum chloride is employed as the polymerization catalyst, it is difficult to control the polymerization so as to produce anything but high boiling polymers.

We have found that olefin polymers boiling above the gasoline boiling point range but which are not heavier than about 25° A. P. I. gravity, can be advantageously converted into gasoline boiling range material by a process of depolymerization wherein said olefin polymer, not heavier than about 25° A. P. I. gravity, is contacted with an adsorbent earth type of catalyst at a temperature sufficient to cause substantial depolymerization but insufficient to cause substantial cracking, withdrawing gasoline, and further contacting the higher boiling, residual oil with such a catalyst at a higher temperature to produce more gasoline.

There is accomplished by the method of the present invention a repression of cracking and a promotion of depolymerization, and an accompanying increase in the yield of gasoline, by conducting the early stage or stages of the polymer conversion at temperatures which cause essentially depolymerization without a substantial amount of other reactions, separating the gasoline so formed, and further converting the residual oil at a higher temperature. By the term "depolymerization" as used herein and in the claims we mean that type of reaction which consists essentially of a conversion of olefin polymer to the original olefins and lower polymers thereof, whereas by the term "cracking" we mean a more fargoing, complex type of reaction leading to other products than the original olefins and their lower polymers.

In an advantageous embodiment of the present invention, the depolymerization is carried out in distinct, successive stages, each succeeding stage being carried out at a higher temperature than the preceding stage, and with separation of gasoline boiling range product after each stage and before the next.

In another embodiment of the invention, a continuous depolymerization is effected in contact with the same body of catalyst, but with continuous separation of gasoline and progressive increase of the temperature. This embodiment of the invention may be carried out, for example, by heating a charge of polymer with a clay catalyst or the like, continuously distilling off gasoline, and gradually raising the temperature. It may, however, be carried out by passing the polymer through a body of catalyst in a downward direction, maintaining a temperature gradient through the body of catalyst such that the temperature increases from the top to the bottom thereof, distilling off gasoline as formed and conducting the vapors of gasoline upwardly through the cooler regions of the catalyst and away from it.

The olefin polymers used in accordance with the invention may be those produced thermally or by the use of one or more of a variety of polymerizing catalysts, such as phosphoric acid, sulfuric acid, aluminum chloride or bromide, zinc chloride, boron fluoride, and fuller's earth. Also, the polymers used in accordance with this invention boil above the gasoline boiling point range but are not heavier than about 25° A. P. I. gravity. They are liquid, not viscous semi-solids, at normal temperatures and they have viscosities and average molecular weights characteristic of kerosene to somewhat heavy lubricating oil, inclusive. We have found that oils of such character, such as those produced by the polymerization of lower olefins, advantageously a mixture comprising two or more $C_3$ to $C_5$ olefins, in the presence of aluminum halides, are unstable toward heat, especially in the presence of adsorbent earth types of catalyst, and are much better suited for conversion to gasoline than are heavier more viscous oils sometimes produced by such polymerization.

Moreover the gasoline thus produced is of high quality.

As an example of how olefin polymers suitable for the purpose of the invention may be prepared, a cracking still gas consisting principally of $C_3$ and $C_4$ hydrocarbons and containing substantial quantities of $C_3$ and $C_4$ olefins is intimately contacted, under a pressure sufficient to liquefy the hydrocarbons, with anhydrous aluminum chloride at a temperature of 50° to 150° F. for a time sufficient to produce an oil having an A. P. I. gravity of about 25° to 45°, advantageously 29° to 43°.

We have found that superior results are obtained by converting the oily polymers thus produced by contact with an adsorbent earth type catalyst at about 550° to 950° F. Such catalysts and such range of temperature result in an optimum combination of yield and quality of product and economy of operation. Examples of suitable adsorbent earth type catalysts capable of use in accordance with the invention are natural, coarse fuller's earth type clays; impregnated fuller's earth; raw, fine mesh contact clays; and activated, fine mesh contact clays. One of the most economically attractive of such catalysts is a dry, 16/30 mesh, natural fuller's earth type of clay which is marketed under the trade name of "Superior Clay."

We have also found that acid-treated clays, that is clays contacted with and leached by a strong mineral acid such as HCl or $H_2SO_4$, produce the best results. For example, a 5 per cent aqueous solution of HCl or $H_2SO_4$ is allowed to percolate down through a bed of clay, such as "Superior Clay," and the clay is then dried and screened to 16/30 mesh size.

Pressures above atmospheric may be employed in my depolymerization process, and the depolymerization to lower boiling oil may be carried out in the liquid phase, but we have found that best results are obtained when approximately atmospheric or lower pressures and vapor phase conversion of the oil are used. Greater yields of gasoline are thus obtained. As used in the specification and claims, however, the term "contacting hydrocarbon oil with an adsorbent-earth type of catalyst," or equivalent expressions, when unqualified, are intended to include contact of the oil vapor or liquid oil, or both, with the solid catalyst.

Advantageously, in the depolymerization, there is recycled to the zone of depolymerization a part of the low boiling or gaseous olefins produced by the depolymerization. The yield of gasoline boiling range material is thereby increased.

Figure 2:
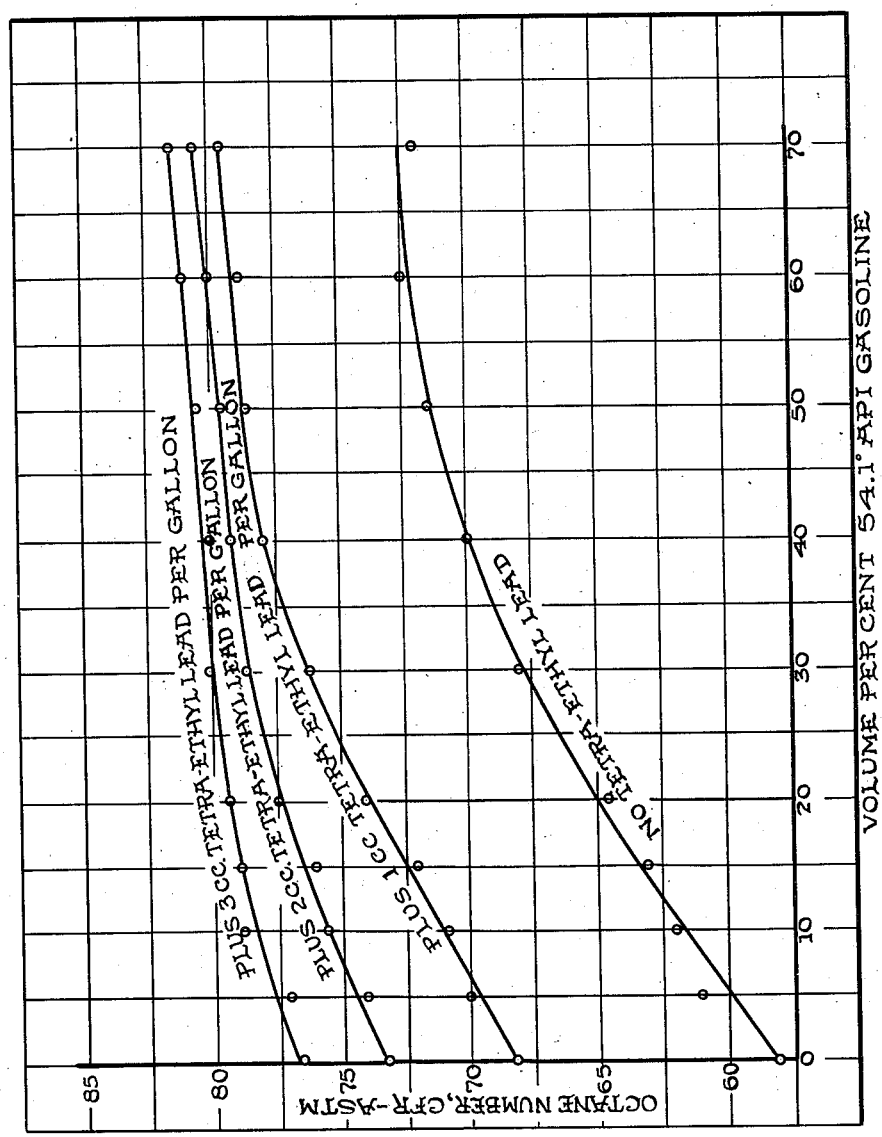
Figure 3:
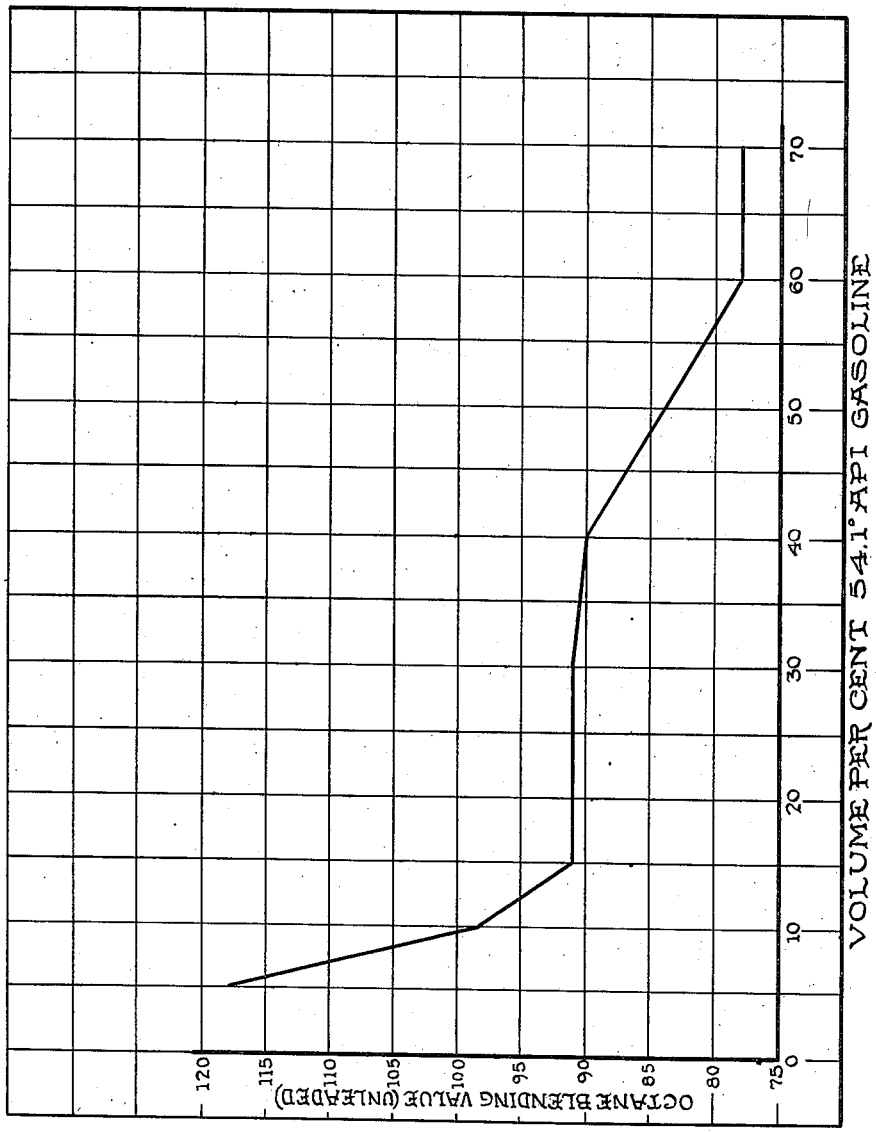

The invention will be further illustrated and better understood by reference to the accompanying drawings. In the drawings, Fig. 1 is a diagrammatic representation of an advantageous embodiment of the invention;

Fig. 2 is a graph showing improvements obtained by blending the gasoline product of the invention with a low antiknock gasoline; and Fig. 3 is a graph showing blending values of the gasoline product of the invention.

Referring to Fig. 1, an olefin polymer of 25° to 45° A. P. I. gravity produced as described above is pumped through a line 1 by a pump 2 into a conversion zone 3 containing an acid treated clay suitably disposed therein and maintained at about 800° to 900° F. and atmospheric pressure or lower. The oil is first heated therein to 800° to 900° F. and then contacted with the clay, thereby causing conversion into lighter products. The conversion products and unconverted oil are passed through a line 4 into a flash chamber or separator 5 wherein the mixture is cooled and a rough separation of normally gaseous hydrocarbons from normally liquid hydrocarbons is effected. The gases are removed through a line 6 and the liquid is removed and pumped through a line 7 by a pump 8 into a fractionating column 11.

In fractionating column 11, the oil is fractionated into a normally gaseous fraction (removed through a line 12), a light gasoline fraction (above about 75° API gravity, and removed through a valved line 13), a heavier gasoline fraction (about 50° to 70° API gravity, and removed through a line 14), and a bottoms (removed through a line 15). The gas fraction removed from column 11 through line 12, and the gas removed from separator 5 through line 6, are conducted to a header 16 by control of which any desired portion of the gas may be recycled to conversion zone 3 through a line 20 by means of pump 21 or removed from the system through a line 22. Part of the light gasoline fraction removed from column 11 through line 13 may be diverted through a valved line 23 and introduced into line 20, thus being recycled to conversion zone 3. Additional olefinic material may be introduced through a line 24 into the recycle stream to zone 3.

Any desired portion of the bottoms removed from column 11 through line 15 may be removed from the system through a valved line 25 or pumped through a valved line 26 by a pump 27 back into conversion zone 3. Advantageously, however, all of the bottoms removed from column 11 is passed through a valved line 28 to a second conversion zone 30, which is similar to conversion zone 3 but is maintained at a substantially higher temperature, advantageously about 950° to 1100° F. The bottoms from column 11 is first heated therein to 950° to 1100° F. and then passed therethrough in contact with an acid treated clay catalyst, thereby causing conversion of the oil to lighter products. The conversion products and unconverted oil are passed through a line 32 into a flash chamber or separator 33 wherein a rough separation of normally gaseous from normally liquid hydrocarbons is effected as in separator 5. The gases are removed through a line 34 and the liquid is removed and pumped through a line 35 by a pump 36 into a fractionating column 37.

In fractionating column 37, as in column 11, the oil is fractionated into a normally gaseous fraction, a light gasoline fraction (above about 75° API), a heavier gasoline fraction (about 50° to 70° API), and a bottoms. These fractions are removed from column 37 through the lines 40, 41, 42 and 43, respectively. The gas fraction removed through line 40, and the gases removed from separator 33 through line 34 are conducted to a header 44 by control of which any desired portion of the gas may be recycled to conversion zone 30 through a line 45 by means of a pump 46 or removed from the system through a line 47. Part of the light gasoline fraction removed from column 37 through line 41 may be diverted through a valved line 50 and introduced into line 45, thus being recycled to the system. Additional olefinic material may be introduced through a line 51 into the recycle stream to zone 30. A connecting line 52 containing a valve and provided with a two-way pump 53 connects recycle line 20 of the first stage conversion with recycle line 45 of the second stage conversion.

By the use of valved line 52 and pump 53, a portion of the gas recycle to zone 3 may be diverted to zone 30 or a portion of the gas recycle to zone 30 may be diverted to zone 3. The bottoms removed from column 37 through line 43 is in part removed from the system through a valved line 54 and in part is pumped through a valved line 55 by a pump 56 back to zone 30.

In the practice of the embodiment of the invention described above with reference to Fig. 1, in the first stage polymer conversion (zone 3) a greater degree of depolymerization and a smaller degree of cracking occurs than in the second stage polymer conversion (zone 30), because of the higher temperature prevailing in zone 30. If desired, three or even more stages of conversion may be employed, the gasoline-free bottoms from each preceding stage being converted in the next stage at a higher temperature. We have found, however, that two- or three-stage conversion is most advantageous.

The following specific examples will further serve to illustrate the practice and the benefits of the invention:

*Example 1.*—To a vessel provided with a stirrer and means for temperature control were charged 1730 parts by weight of a liquefied cracking still gas and 1 part by weight of anhydrous aluminum chloride. The cracking still gas tested as follows (volume per cent, gas basis):

| | Per cent |
|---|---|
| Acid gas | 0.3 |
| Propylene | 1.4 |
| Propane | 3.4 |
| Isobutylene | 20.2 |
| n-Butylenes | 34.4 |
| Butanes | 40.3 |
| Total | 100.0 |

The stirrer was started and the temperature was maintained at about 90° F. A pressure of 80 pounds per square inch gauge was initially maintained in the vessel to liquefy the reactants, but this pressure dropped during the subsequent reaction to about 25 pounds. Anhydrous aluminum chloride was added in portions of 1 part by weight every 2 hours until, after about 30 hours, a sample of gas taken from the vessel was found to contain substantially no unsaturates. In all, 17 parts by weight of aluminum chloride were added. The vessel was then opened and normally gaseous hydrocarbons, containing only 1.5 per cent of unsaturates, were removed. A liquid polymer product amounting to almost 100 per cent by weight on the olefins in the charge and testing as follows, was left as residue:

| | | |
|---|---|---|
| Gravity | °API | 35.1 |
| Viscosity: SUV: | | |
| 100° F | | 811 |
| 210° F | | 81 |
| Viscosity index | | 100 |
| Flash, OC | °F | 220 |
| Fire, OC | °F | 285 |
| Pour | °F | below −25 |
| Color, Saybolt | | +8 |
| Sulfur, B | per cent | 0.02 |
| Chloride | do | 0.02 |
| Acid heat | °F | 4 |
| Iodine No., Mod. Hanus | | 60.7 |
| Neutralization No | | Neutral |
| Aniline point | °F | 261.1 |

The above liquid polymer was passed through a bed of acid treated 20/30 mesh No. ½ Superior Clay maintained at about 840° F. and was maintained at atmospheric pressure. The ratio of clay to total charge was 0.226 pound of clay per gallon of charge. A contact time of 9.7 seconds was maintained. By this treatment, 7.8 per cent by weight of the charge was converted to normally gaseous hydrocarbons and the remainder to a liquid, testing, respectively, as follows:

Gas analysis

| | Per cent by volume of gas |
|---|---|
| H₂ and CH₄ | 8.94 |
| Ethylene | 2.48 |
| Ethane | 3.88 |
| Propylene | 12.50 |
| Propane | 5.28 |
| Isobutylene | 46.66 |
| n-Butylenes | 7.33 |
| Butanes | 7.33 |
| Pentanes | 4.31 |
| Hexanes and higher hydrocarbons | 1.29 |
| Total | 100.00 |

Liquid analysis

| | | |
|---|---|---|
| Gravity | °API | 62.9 |
| Color, NPA | | 2.5 |
| Acid heat | °F | 158 |
| Distillation, gasoline: | | |
| Over point | °F | 93 |
| End point | °F | 635 |
| 10% at | °F | 131 |
| 50 | | 316 |
| Recovery | per cent | 83 |
| Residue | do | 3 |
| Loss | do | 14 |

The above liquid was debutanized, the overhead containing 71 per cent butylenes and 10 per cent propylene. The debutanized bottoms was fractionated into a gasoline fraction and a heavier oil fraction. The gasoline fraction, amounting to 73 per cent by weight of the debutanized bottoms (61 per cent by weight of the olefins charged to the polymerization process), tested as follows:

| | | |
|---|---|---|
| Gravity | °API | 62.0 |
| Doctor | | Good |
| Sulfur, L | per cent | 0.02 |
| Chloride | do | 0.03 |
| Acid heat | °F | 160 |
| Iodine No., Mod. Hanus | | 248 |
| Octane No., CFR-ASTM | | 78.0 |
| Octane blending value (in 80% of 44.0 octane stock) | | 111.0 |
| Distillation, gasoline: | | |
| Over point | °F | 109 |
| End point | °F | 406 |
| 10% at | °F | 150 |
| 50 | | 249 |
| 90 | | 365 |
| Recovery | per cent | 98 |
| Residue | do | 1 |
| Loss | do | 1 |

The heavier oil fraction of the distillation described above amounted to 21 per cent by weight of the debutanized bottoms. It had an API gravity of 40.3° and a distillation range of 444° to 686° F. This 40.3° API fraction was submitted to further conversion by passing it through a bed of acid treated 16/20 mesh No. ½ Superior Clay maintained at a temperature of about 1015° F., the contact time and clay-to-charge ratio being about 6.7 seconds and 0.717 pound per galion of charge, respectively. Gas equal to 35 per cent by weight of the charge and a liquid equal to 62 per cent by weight of the charge were thus obtained, testing, respectively, as follows:

*Gas analysis*

| | Per cent by volume of gas |
|---|---|
| Acid gas (H2S Orsat) | 0.52 |
| Methane | 39.04 |
| Ethylene | 10.91 |
| Ethane | 13.33 |
| Propane | 5.35 |
| Propylene | 13.64 |
| Isobutylene | 5.25 |
| n-Butylene | 4.20 |
| Isobutane, n-butane | 3.40 |
| Pentane and heavier | 4.72 |

*Liquid analysis*

| | | |
|---|---|---|
| Gravity | °API | 42.6 |
| Sulfur, L | per cent | 0.01 |
| Chloride | do | 0.03 |
| Acid heat | °F | 104 |
| Iodine No., Mod. Hanus | | 115.4 |
| Distillation gasoline: | | |
| Over point | °F | 104 |
| End point | °F | 646 |
| 10% at | °F | 173 |
| 50 | | 440 |
| 90 | | 605 |
| Per cent at 392° F | | 41 |
| Recovery | per cent | 92 |
| Residue | do | 1 |
| Loss | do | 7 |

On fractionation, the above liquid yielded 44.5 per cent by weight of gasoline and 52 per cent by weight of bottoms, percentages being based on liquid charged to the still. The bottoms had a boiling range of 462° to 673° F. and the gasoline tested as follows:

| | | |
|---|---|---|
| Gravity | °API | 54.1 |
| Sulfur, L | | 0.01 |
| Chloride | per cent | 0.04 |
| Acid heat | °F | 180 |
| Iodine No., Mod. Hanus | | 191 |
| Octane No., CFR-ASTM | | 78 |
| Octane blending value (in 80% of 44.0 octane stock) | | 107 |
| Distillation gasoline: | | |
| Over point | °F | 112 |
| End point | °F | 418 |
| 10% at | °F | 156 |
| 50 | | 264 |
| 90 | | 384 |
| Recovery | per cent | 98 |
| Residue | do | 1 |
| Loss | do | 1 |

*Example 2.*—The 54.1° API gasoline whose analysis is set forth in the last paragraph of Example 1 was blended with different low antiknock cracked and straight run gasolines and with a mixture of straight run gasoline and cracked gasoline. The addition of only 10 per cent by volume of the above 54.1° API gasoline produced in the blends the following increases in octane number, the first figure in the right-hand column being the octane number of the base stock, the second figure being the octane number of the blend, and the third figure being the difference in or increase of octane number due to 10 per cent of the added gasoline:

| Base stock | 54.1° API gasoline | Increase in octane No. (CFR-ASTM method) |
|---|---|---|
| (1) Cracked gasoline from Gulf Coastal crude. | 10% of blend. | 66.0 to 68.0=2.0 |
| (2) Cracked gasoline from Rodessa crude. | do | 62.0 to 63.8=1.8 |
| (3) Cracked gasoline from West Texas crude. | do | 66.3 to 67.6=1.3 |
| (4) Straight run gasoline from East Texas crude. | do | 54.6 to 59.0=4.4 |
| (5) Straight run gasoline from West Texas crude. | do | 53.0 to 57.3=4.3 |
| (6) 50 per cent straight run and 50 per cent cracked gasoline (per cent by volume). | do | 58.0 to 62.0=4.0 |

In Fig. 2 is shown graphically the results of blending various amounts, up to 70 per cent by volume on the blend, of the 54.1° API gravity gasoline of Example 1 with the 50–50 volume mixture of straight run and cracked gasoline referred to above (No. 6 in the above table). In this figure, abscissae represent percentages by volume of 54.1° API gasoline in the blend and ordinates represent octane numbers (CFR-ASTM method). The bottom curve represents blends without added tetra-ethyl lead and the upper curves represent blends with various amounts of added tetra-ethyl lead, as shown.

In Fig. 3 are shown the blending values of the 54.1 A. P. I. gasoline of Example 1 with the 50–50 mixture referred to above (No. 6 in the above table). In this figure, abscissae represent percentages by volume of the 54.1° A. P. I. gasoline in the blends and ordinates represent the octane blending values (CFR-ASTM) of the 54.1° A. P. I. gasoline. These octane blending values are derived by a well known method, being calculated from the known octane number of the base stock (50–50 mixture) and the known octane number of the blend on the assumption that the octane number of the added gasoline is proportional to its amount and to its octane number. Such octane blending values are a criterion of the effectiveness of high octane gasolines for blending purposes. As is evident from Fig. 3, the gasoline product of the invention has a very high blending value when used in small amounts; it has the apparent effect when used in small amounts of a very much higher octane number gasoline.

While the invention has been described with particular reference to certain embodiments and specific examples, it is not limited to such embodiments and specific examples except as defined in the appended claims.

What we claim is:

1. A method of depolymerizing olefin polymers which comprises contacting an olefin polymer of about 25° to 45° A. P. I. gravity with an adsorbent earth type of catalyst, first at a temperature sufficient to cause substantial depolymerization of the polymer to gasoline but insufficient to cause substantial cracking of the polymer, separating gasoline so formed, and then contacting the residual polymer with an adsorbent earth type of catalyst at a higher temperature to further depolymerize it and so produce more gasoline.

2. The method of claim 1, wherein the polymer is a 25° to 45° A. P. I. gravity oil and the adsorbent earth type catalyst is a clay.

3. The method of claim 1, wherein the temperature at which the polymer is first contacted with catalyst is between about 550° and 950° F.

4. A method of producing gasoline, which comprises contacting an olefin polymer of about 25° to 45° A. P. I. gravity with an adsorbent earth type of catalyst at a temperature between about 550° and 950° F. sufficient to depolymerize a substantial amount of the polymer to gasoline boiling range hydrocarbons without substantial cracking, separating the gasoline boiling range hydrocarbons, and contacting the residual polymer with an adsorbent-earth type of catalyst at a temperature between about 950° and 1100° F. to further depolymerize it and so produce more gasoline boiling range hydrocarbons, and separating gasoline boiling range hydrocarbons.

5. A method of producing gasoline, which comprises contacting an olefin polymer of about 25° to 45° A. P. I. gravity in a contacting zone with an adsorbent earth type of catalyst at a temperature between about 550° and 950° F. sufficient to depolymerize a substantial amount of the polymer to gasoline boiling range hydrocarbons without substantial cracking, separating from the product of depolymerization a lower olefin fraction and a gasoline boiling range fraction, recycling to said contacting zone, together with further quantities of said olefin polymer, a portion of said lower olefin fraction, and contacting the higher boiling residue of depolymerization product and undepolymerized polymer with an adsorbent-earth type of catalyst at a temperature between about 950° and 1100° F. to further depolymerize it and so produce more gasoline boiling range hydrocarbons, and separating gasoline boiling range hydrocarbons.

LESLIE U. FRANKLIN.
EDWARD E. DUNLAY.